(12) United States Patent
Kanbe

(10) Patent No.: US 7,050,218 B2
(45) Date of Patent: May 23, 2006

(54) ELECTROPHORETIC DISPERSION, ELECTROPHORETIC DISPLAY DEVICE, METHOD OF MANUFACTURING ELECTROPHORETIC DISPLAY DEVICE, AND ELECTRONIC SYSTEM

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/205,005

(22) Filed: Aug. 17, 2005

(65) Prior Publication Data

US 2005/0286116 A1    Dec. 29, 2005

Related U.S. Application Data

(62) Division of application No. 10/862,609, filed on Jun. 8, 2004, now Pat. No. 6,947,203.

(30) Foreign Application Priority Data

Jun. 24, 2003 (JP) ............................ 2003-179602
Aug. 6, 2003 (JP) ............................ 2003-288268

(51) Int. Cl.
    G02B 26/00 (2006.01)
    G02F 1/03 (2006.01)
    G09G 3/34 (2006.01)
    G03G 17/04 (2006.01)
    G08F 2/58 (2006.01)

(52) U.S. Cl. ....................... 359/296; 359/252; 359/253; 345/107; 430/34; 204/492; 204/496; 348/803

(58) Field of Classification Search ............... 359/296, 359/252, 267; 345/107, 105, 84; 348/803; 430/34, 35; 204/492, 496, 500
See application file for complete search history.

(56) References Cited

U.S. PATENT DOCUMENTS

| | | | |
|---|---|---|---|
| 3,476,668 A * | 11/1969 | Kowarik et al. | 204/492 |
| 3,510,419 A | 5/1970 | Carreira et al. | 430/34 |
| 3,676,383 A | 7/1972 | Scala et al. | 106/253 |
| RE28,360 E * | 3/1975 | Evans et al. | 348/803 |
| 6,661,563 B1 * | 12/2003 | Hayashi et al. | 359/296 |

(Continued)

FOREIGN PATENT DOCUMENTS

| | | |
|---|---|---|
| JP | A 62-50886 | 3/1987 |
| JP | 02-189525 | 7/1990 |
| JP | A 8-510790 | 11/1996 |

(Continued)

*Primary Examiner*—Loha Ben
(74) *Attorney, Agent, or Firm*—Oliff & Berridge, PLC

(57) ABSTRACT

To provide an electrophoretic dispersion capable of reducing or preventing the aggregation of electrophoretic particles, an electrophoretic display device using the electrophoretic dispersion, a method of manufacturing the electrophoretic display device, and an electronic system superior in display performance; an electrophoretic display device (electrophoretic display unit) has: a first substrate with a first electrode; a second substrate with a second electrode opposite the first electrode; and an electrophoretic dispersion provided between the first substrate and second substrate. The electrophoretic dispersion (dispersion for electrophoretic display units) includes a liquid phase insulative dispersion medium and electrophoretic particles dispersed in the dispersion medium, the particles electrophoretically migrated under an influence of an electric field. Also included as the electrophoretic particles, inorganic particles and resin particles dyed a color different from that of the inorganic particles and having an electrical polarity opposite to that of the inorganic particles.

20 Claims, 12 Drawing Sheets

U.S. PATENT DOCUMENTS

| | | | |
|---|---|---|---|
| 6,671,081 B1 | 12/2003 | Kawai | 359/296 |
| 6,721,084 B1 * | 4/2004 | Kawai | 359/296 |
| 6,741,385 B1 | 5/2004 | Ikeda et al. | 359/296 |
| 6,876,476 B1 | 4/2005 | Miura et al. | 359/252 |
| 2002/0027701 A1 | 3/2002 | Yanagisawa et al. | 359/267 |
| 2004/0145562 A1 | 7/2004 | Horikiri | 345/107 |
| 2004/0184136 A1 | 9/2004 | Goden | 359/296 |

FOREIGN PATENT DOCUMENTS

| | | |
|---|---|---|
| JP | A 2001-056653 | 2/2001 |
| JP | A 2001-235771 | 8/2001 |
| JP | A 2002-140198 | 5/2002 |
| JP | A 2002-202533 | 7/2002 |
| JP | A 2003-022913 | 1/2003 |

* cited by examiner

ELECTROPHORETIC DISPERSION, ELECTROPHORETIC DISPLAY DEVICE, METHOD OF MANUFACTURING ELECTROPHORETIC DISPLAY DEVICE, AND ELECTRONIC SYSTEM

This is a Division of application Ser. No. 10/862,609 filed Jun. 8, 2004 now U.S. Pat. No. 6,947,203. The entire disclosure of the prior application is hereby incorporated by reference herein in its entirety.

BACKGROUND OF THE INVENTION

1. Field of Invention

The present invention relates to an electrophoretic dispersion, an electrophoretic display device, a method of manufacturing an electrophoretic display device, and an electronic system.

2. Description of Related Art

In recent years, portable information systems have been intensively enhanced. Demand for thin display devices with low power consumption are particularly growing. Various attempts have been made to cope with such demands. Liquid crystal display devices (liquid crystal display units) have satisfied the demands until now.

SUMMARY OF THE INVENTION

However, such liquid crystal display devices have a problem in that display visibility is reduced depending on the view angle or due to reflected light. Also, a viewer's eyes may suffer from the flicker of light sources. Therefore, numerous attempts are being made to develop display devices harmless to eyes.

Reflective display devices are attracting much attention because the units have low power consumption and are harmless to eyes. An electrophoretic display device (electrophoretic display unit) is known as one of the reflective display devices.

FIG. 15 illustrates the operational principle of a related art electrophoretic display device. The electrophoretic display device 920 includes: charged electrophoretic particles 905; a colored insulating liquid (dispersion medium) 906 containing a dissolved colorant; and a pair of substrates 901 having the respective transparent electrodes 903 facing each other with the colored insulating liquid 906 placed therebetween.

When a voltage is applied to the colored insulating liquid 906 through the transparent electrodes 903, the charged electrophoretic particles 905 are attracted toward the transparent electrode 903 having an electrical polarity opposite to that of the charged particles 905.

In the electrophoretic display device 920, the display is provided based on the contrast in color between the charged electrophoretic particles 905 and the colored insulating liquid 906. In addition, desired information (picture image) can be displayed by forcing the transparent electrodes 903 arranged on one side to form a desired pattern.

Specifically, when a voltage is applied to the transparent electrodes 903 to provide the electrodes with a given polarity and to cause the white electrophoretic particles 905 to be attracted toward the transparent electrodes 903 placed close to observers, the observers can observe the information through the desired pattern in white using the color of the colored insulating liquid 906 as its background. Further, when a voltage is applied to the transparent electrodes 903 so that the reversed situation arises, the electrophoretic particles 905 are attracted toward the electrode on the opposite side and the observers observe the color of the colored insulating liquid 906.

The principle of a related art electrophoretic display device 920 is as described above. But the electrophoretic display device 920 illustrated in FIG. 15 has a problem such that the display contrast is low because spaces between the electrophoretic particles 905 are filled with the colored insulating liquid 906 in a display state in white.

In order to cope with the problem, electrophoretic display devices have been proposed, which use two types of electrophoretic particles having electrical polarities opposite to each other and different colors (color tones) and use an insulating liquid which is colorless and transparent.

However, the related art electrophoretic display device has the following problems of unreliable dispersion of electrophoretic particles in the insulating liquid because of using pigment particles having different sizes as the electrophoretic particles, the difficulty in performing the crushing of the electrophoretic particles, etc.

The related art electrophoretic display device has a problem such that it is difficult for the electrophoretic particles to electrophoretically migrate in the insulating liquid because a surfactant is used in order to enhance the dispersibility and electrification of the electrophoretic particles. Thus the electrophoretic particles are aggregated due to the surfactant adhering to the particles.

In order to cope with the aggregation of the two types of particles, a technique to process the surface of one type of particles with a coupling agent is disclosed.

However, the related art method has a problem such that the satisfying anti-aggregation effect cannot be obtained depending on the constitutive materials and combination of the two types of particles.

The invention provides an electrophoretic dispersion that reduces or prevents the aggregation among electrophoretic particles, an electrophoretic display device using the electrophoretic dispersion, a method of manufacturing the electrophoretic display device, and an electronic system superior in display performance.

The electrophoretic dispersion of an aspect of the invention is an electrophoretic dispersion including: an insulative liquid phase dispersion medium; and electrophoretic particles dispersed in the insulative dispersion medium and electrophoretically migrated under an influence of an electric field, the electrophoretic particles including inorganic particles, and resin particles dyed a color different from that of the inorganic particles and having an electrical polarity opposite to that of the inorganic particles.

Thus, the aggregation of the electrophoretic particles (the aggregation of the inorganic particles and resin particles) can be reduced or prevented.

In the electrophoretic dispersion of an aspect of the invention, the resin particles may be made mainly from an acrylic resin.

Thus, the aggregation of the electrophoretic particles can be reduced or prevented.

In the electrophoretic dispersion of an aspect of the invention, the acrylic resin may have, as a polar group, at least one of a hydroxyl group and an amino group.

Thus, the resistance property of the resin particles with respect to the liquid phase dispersion medium can be increased.

In the electrophoretic dispersion of an aspect of the invention, the polar group may be introduced by copolymerizing an acrylic monomer having the polar group with the acrylic resin.

According to such a method, it is possible to obtain an acrylic resin having a polar group relatively readily at a high yield.

In the electrophoretic dispersion of an aspect of the invention, the resin particles may be dyed any one of red, green, blue, and black.

Thus, it becomes possible to display information in multiple colors.

In the electrophoretic dispersion of an aspect of the invention, a relation such that B/A falls in 1.5–200 may be satisfied, where the inorganic particles have an average particle size of A[μm] and the resin particles have an average particle size of B[μm].

Thus, it becomes possible to effectively reduce or prevent the aggregation of the inorganic particles and resin particles while maintaining the dispersibilities of the inorganic particles and resin particles in the liquid phase dispersion medium suitably.

In the electrophoretic dispersion of an aspect of the invention, the average particle size of the resin particles may be 0.5–20 μm.

This can achieve the effects of effectively reducing or preventing the aggregation of the inorganic particles and resin particles while maintaining the dispersibilities of the inorganic particles and resin particles in the liquid phase dispersion medium suitably, preventing electrophoretic display devices from upsizing, preventing the reduction in production efficiency, and the like.

The electrophoretic display device of an aspect of the invention is characterized by includes: a first substrate; a second substrate opposite the first substrate; an electrophoretic dispersion located between the first substrate and the second substrate, the electrophoretic dispersion including an insulative liquid phase dispersion medium and electrophoretic particles dispersed in the insulative dispersion medium and electrophoretically migrated under an influence of an electric field; a pair of electrodes to cause an electric field to act on the electrophoretic particles; and the electrophoretic particles including inorganic particles and resin particles dyed a color different from that of the inorganic particles and having an electrical polarity opposite to that of the inorganic particles.

Thus, an electrophoretic display device superior in display performance can be obtained.

The electrophoretic display device of an aspect of the invention includes: a first substrate; a second substrate opposite the first substrate; microcapsules encapsulating an electrophoretic dispersion located between the first substrate and the second substrate, the electrophoretic dispersion including an insulative liquid phase dispersion medium and electrophoretic particles dispersed in the insulative dispersion medium and electrophoretically migrated under an influence of an electric field; a pair of electrodes for causing an electric field to act on the electrophoretic particles; and the electrophoretic particles including inorganic particles, and resin particles dyed a color different from that of the inorganic particles and having an electrical polarity opposite to that of the inorganic particles.

Thus, an electrophoretic display device superior in display performance can be obtained.

The electrophoretic display device of the invention may have a plurality of TFT (thin film transistor) elements arranged in a matrix.

Thus, an electrophoretic display device having a high speed of response can be obtained.

The electrophoretic display device of an aspect of the invention may further include: a plurality of TFT elements arranged in a matrix; and a plurality of cell spaces partitioned off by partitions and formed between the first and second substrates, the cell spaces are each filled with the electrophoretic dispersion, and each of the cell spaces corresponding to at least one of the TFT elements.

Thus, it becomes possible to display an image in multiple colors by combining the colors of electrophoretic dispersions filled in the cell spaces.

The electrophoretic display device of an aspect of the invention may include a plurality of TFT elements arranged in a matrix, plural kinds of the microcapsules including the resin particles dyed different colors provided between the first and second substrates, and each of the microcapsules corresponding to at least one of the TFT elements.

Thus, it becomes possible to display an image in multiple colors.

A method of manufacturing the electrophoretic display device of an aspect of the invention is a method of manufacturing an electrophoretic display device including: a first substrate; a second substrate opposite the first substrate; an electrophoretic dispersion located between the first substrate and the second substrate, the electrophoretic dispersion including an insulative liquid phase dispersion medium and electrophoretic particles dispersed in the insulative dispersion medium and electrophoretically migrated under an influence of an electric field; a pair of electrodes to cause an electric field to act on the electrophoretic particles; a plurality of TFT elements arranged in a matrix; the electrophoretic particles including inorganic particles and resin particles dyed a color different from that of the inorganic particles and having an electrical polarity opposite to that of the inorganic particles; a plurality of cell spaces partitioned off by partitions and formed between the first and second substrates; the cell spaces each filled with the electrophoretic dispersion; and each of the cell spaces corresponding to at least one of the TFT elements, the method including filling the cell spaces with the electrophoretic dispersion by a process using a dispenser or by an ink-jet method.

According to such a method, the electrophoretic dispersion can be filled into the cell spaces more readily and reliably.

A method of manufacturing the electrophoretic display device of an aspect of the invention is a method of manufacturing an electrophoretic display device including: a first substrate; a second substrate opposite the first substrate; microcapsules encapsulating an electrophoretic dispersion located between the first substrate and the second substrate, the electrophoretic dispersion including an insulative liquid phase dispersion medium and electrophoretic particles dispersed in the insulative dispersion medium and electrophoretically migrated under an influence of an electric field; a pair of electrodes to cause an electric field to act on the electrophoretic particles; a plurality of TFT elements arranged in a matrix; the electrophoretic particles including inorganic particles, and resin particles dyed a color different from that of the inorganic particles and having an electrical polarity opposite to that of the inorganic particles; plural kinds of microcapsules including resin particles dyed different colors provided between first and second substrates; and each of the microcapsules corresponding to at least one of the TFT elements, the method characterized by including fixing a given kind of microcapsules, including resin particles dyed a given color, on the first substrate or the second substrate through an adhesive so as to electrically connect with a target TFT element of the TFT elements; and repeating at least a number of times depending on the kind of microcapsules.

According to such method, the microcapsules can be placed on the substrate more readily and reliably.

The electronic system of an aspect of the invention includes the electrophoretic display device of an aspect of the invention.

Thus, an electronic system superior in display performance can be obtained.

DETAILED DESCRIPTION OF EXEMPLARY EMBODIMENTS

An electrophoretic dispersion, an electrophoretic display device, a method of manufacturing the electrophoretic display device, and an electronic system, according to aspects of the invention will be described in detail below in reference to the accompanying drawings.

First Exemplary Embodiment

A first exemplary embodiment of the electrophoretic display device of the invention will be described first.

Figure 1:
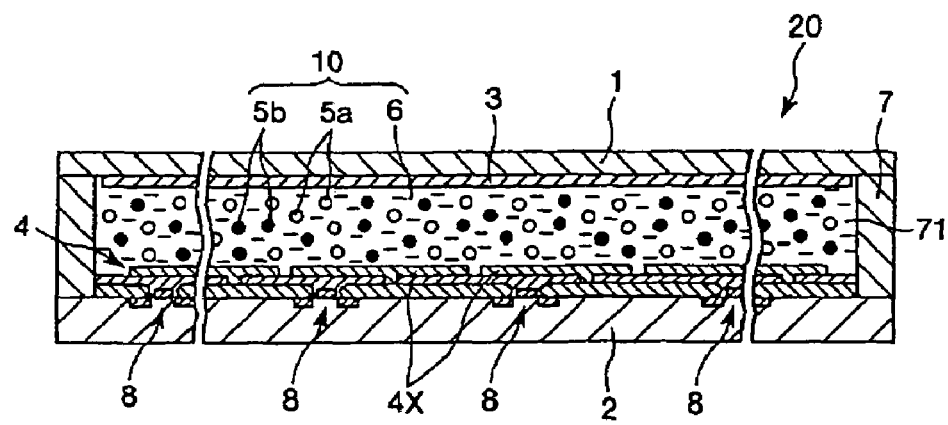
FIG. 1 is a longitudinal cross-sectional schematic showing a first exemplary embodiment of the electrophoretic display device of the invention.
Figure 2:
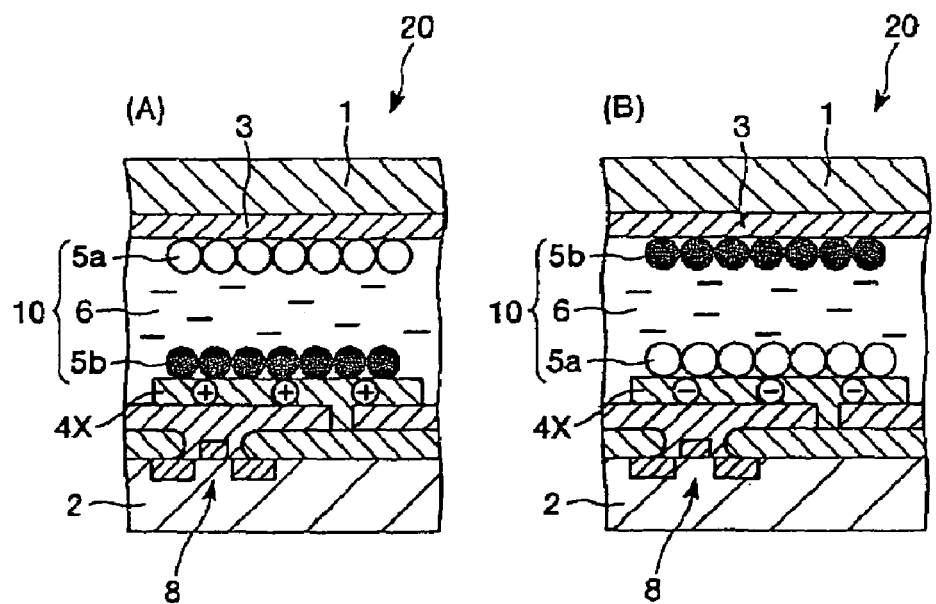
FIG. 2 is a schematic showing the working principle of the electrophoretic display device illustrated in FIG. 1.

FIG. 1 is a longitudinal cross-sectional schematic showing the first exemplary embodiment of the electrophoretic display device of the invention. FIG. 2 is a schematic showing the working principle of the electrophoretic display device illustrated in FIG. 1.

For convenience of explanation, in the description to be presented below, the upper sides in the FIGS. 1 and 2 are expressed by "top" or "above" and the lower sides are expressed by "bottom" or "below."

The electrophoretic display device (electrophoretic display unit) 20 illustrated in FIG. 1 has: a first substrate 1 with a first electrode 3; a second substrate 2 with a second electrode 4 facing the first electrode 3; and an electrophoretic dispersion 10 provided between the first substrate 1 and the second substrate 2. The portions thereof will be described below in turn.

The first substrate 1 and the second substrate 2 are each composed of a sheet (plate) member, and have the functions of supporting and protecting the members disposed therebetween.

The substrates 1, 2 may be each either flexible or rigid, but it is preferable that they have flexibility. Use of the flexible substrates 1, 2 can offer an electrophoretic display device 20 having flexibility, i.e. an electrophoretic display device 20 useful for, for example, making up an electronic paper.

When the flexible substrates 1, 2 are made, their constitutive materials each include, for example, a polyolefin, e.g. polyethylene, polypropylene, and ethylene-vinyl acetate copolymer, a modified polyolefin, a polyamide (e.g. Nylon 6, Nylon 46, Nylon 66, Nylon 610, Nylon 612, Nylon 11, Nylon 12, Nylon 6-12, Nylon 6-66), a thermoplastic polyimide, a liquid crystal polymer, such as aromatic polyester, polyphenylene oxide, polyphenylene sulfide, polycarbonate, polymethyl methacrylate, polyether, poly(ether-ether-ketone), polyether imide; polyacetal; and various kinds of thermoplastic elastomers of styrene, polyolefin, polyvinyl chloride, polyurethane, polyester, polyamide, polybutadiene, transpolyisoprene, fluororubber, chlorinated polyethylene, etc., and a copolymer, a blend, and a polymer alloy predominantly composed of them, one or more kinds of which may be mixed and used.

The (average) thicknesses of such substrates 1, 2 are each set appropriately depending on the constitutive materials, applications, etc. Although the thicknesses are not particularly limited, the thicknesses may be about 20–500 μm and preferably about 25–250 μm, when the substrates are flexible. Thus, it becomes possible to downsize (and especially to slim) the electrophoretic display device 20 while matching the flexibility and strength of the electrophoretic display device 20 to each other.

The first electrode 3 and second electrode 4, each forming a layer (a film), are provided respectively on surfaces of the substrates 1, 2 on the side of the electrophoretic dispersion 10 to be described later, i.e. on the bottom surface of the first substrate 1 and the top surface of the second substrate 2.

When a voltage is applied between the first electrode 3 and the second electrode 4, an electric field is produced therebetween, which acts on the electrophoretic particles in the electrophoretic dispersion 10.

In this exemplary embodiment, the first electrode 3 is a common electrode, and the second electrode 4 is divided into separate electrodes (pixel electrodes) 4X in a matrix (a rectangular array of rows and columns). Each separate electrode 4X and a portion of the first electrode 3 which overlaps the separate electrode constitute a unit pixel.

Further, as shown in FIG. 1, TFT elements (switching elements) 8 are disposed between the second electrode 4 and the second substrate 2 so that the TFT elements are electrically connected corresponding to the separate electrodes (driving electrodes) 4X. Therefore, the device is designed so that a voltage can be applied independently between the separate electrodes 4X and the first electrode 3.

In this exemplary embodiment, the separate electrodes 4X are arranged in a matrix, and the TFT elements 8 are arranged in a matrix accordingly.

Also, the first electrode 3 may be divided into plural ones as are the second electrode 4.

The constitutive materials of the electrodes 3, 4 are not particularly limited as long as the materials are substantially conductive. For example, the constitutive materials may be any of various conductive materials including: a metal material of copper, aluminum, nickel, cobalt, platinum, gold, silver, molybdenum, or tantalum, or a metal alloy containing any of them; a carbon-based material of carbon black, carbon nanotube, or fullerene; an electron-conducting polymeric material of polyacetylene, polypyrrole, polythiophene, polyaniline, poly(p-phenylene), poly(p-phenylene vinylene), polyfluorene, polycarbazole, polysilane, or the derivatives thereof, or the like; an ion-conducting polymeric material prepared by dispersing an ionic substance in a matrix resin of polyvinyl alcohol, polycarbonate, polyethylene oxide, polyvinyl butyral, polyvinyl carbazole, vinyl acetate, or the like, the ionic substance consisting of NaCl, $LiClO_4$, KCl, $H_2O$, LiCl, LiBr, LiI, $LiNO_3$, LiSCN, $LiCF_3SO_3$, NaBr, NaI, NaSCN, $NaClO_4$, $NaCF_3SO_3$, KI, KSCN, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $CaBr_2$, $CaI_2$, $CaSCN_2$, $Ca(ClO_4)_2$, $Ca(CF_3SO_3)_2$, $ZnCl_{Zn(ClO4)}{}_2$, $Zn(CF_3SO_3)_2$, $CuCl_2$, $CuI_2$, $CuSCN_2$, $Cu(ClO_4)_2$, $Cu(CF_3SO$ conductive oxide material of indium tin oxide (ITO), fluorine-doped tin oxide (FTO), tin oxide ($SO_2$), indium oxide (IO), or the like. These constitutive materials may be used individually or in a combination of two or more kinds.

As other constitutive materials for the electrodes 3, 4, for example, various kinds of composite materials may be used respectively, to which conductivity is imparted by mixing a conductive material (conductive particles) of gold, silver, nickel, carbon, or the like into a non-conductive material of glass material, rubber material, polymeric material, or the like.

Examples of such composite materials include, for example, a conductive rubber prepared by mixing a conductive material into a rubber material, a conductive adhesive or conductive paste prepared by mixing a conductive material into an adhesive composition of epoxy, urethane, acrylic, or the like, and a conductive resin prepared by mixing a conductive material into a matrix resin of polyolefin, polyvinyl chloride, polystyrene, ABS resin, Nylon (polyamide), ethylene-vinyl acetate copolymer, polyester, acrylic resin, epoxy-based resin, urethane-based resin, or the like.

The (average) thicknesses of such electrodes 3, 4 are each set appropriately depending on the constitutive materials, applications, etc. and they are not particularly limited, but suitably about 0.05–10 μm, more suitably about 0.05–5 μm.

Of the substrates 1, 2 and the electrodes 3, 4, the substrate and electrode disposed on the display side (i.e. the first substrate 1 and the first electrode 3 in this exemplary embodiment) have each an optical transparency, i.e., they may be substantially transparent (colorless and transparent, colored and transparent, or translucent). Thus, it becomes possible to visually recognize conditions of the electrophoretic particles in the electrophoretic dispersion 10 to be described later, i.e. the information (picture image) displayed in the electrophoretic display device 20.

The electrodes 3, 4 may each have, for example, a multilayer structure, as produced by the sequential stacking of a plurality of materials, in addition to a single-layer structure composed of a single body of a material as mentioned above. Specifically, the electrodes 3, 4 may each have a single-layer structure composed of, for example, an ITO, or a two-layer structure composed of an ITO layer and a polyaniline layer.

Further, between the first substrate 1 and the second substrate 2 and in a vicinity of a side portion of the electrophoretic display device 20, there may be provided a spacer 7 having the function of determining the distance between the first electrode 3 and the second electrode 4.

In this exemplary embodiment, the spacer 7 is provided so as to surround the periphery of the electrophoretic display device 20 and the spacer also has, as a sealing member, the function of defining (forming) a sealed space 71 between the first substrate 1 and the second substrate 2.

The constitutive materials for the spacer 7 include a resin material of epoxy-based resin, acrylic resin, urethane-based resin, melamine-based resin, phenol resin, or the like, and a ceramic material of silica, alumina, titania, or the like, for example. These constitutive materials may be used individually or in combination of two ore more kinds of them.

The (average) thickness of such spacer 7, i.e. the distance between the electrodes 3 and 4 (inter-electrode distance), is not particularly limited, but suitably about 10–500 μm, more suitably about 20–100 μm.

The spacer 7 is not limited to a configuration such that it is provided surrounding the periphery of the electrophoretic display device 20. For example, a plurality of spacers 7 may be provided in vicinities of the side portion of the electrophoretic display device 20 at given intervals. In this case, the gaps between the spacers 7 may be sealed with the other sealant (sealing material).

The sealed space 71 (the cell's inside space defined by one pair of the substrates and the spacer 7) contains (is filled with) the electrophoretic dispersion 10 of an aspect of the invention. Thus, the electrophoretic dispersion 10 is in contact with the first electrode 3 and the second electrode 4 directly.

The electrophoretic dispersion (dispersion for electrophoretic display units) 10 is prepared by dispersing electrophoretic particles, which are electrophoretically migrated under an influence of an electric field, into the liquid phase insulative dispersion medium 6.

In an aspect of the invention, the electrophoretic particles include inorganic particles, and resin particles dyed a color different from that of the inorganic particles and having an electrical polarity opposite to that of the inorganic particles.

The inorganic particles and resin particles are combined and used as electrophoretic particles, whereby the aggregation of the electrophoretic particles can be reduced or prevented.

In this exemplary embodiment, two kinds of electrophoretic particles, i.e. white inorganic particles 5a and colored resin particles 5b, are used.

The inorganic particles 5a and the resin particles 5b are not particularly limited and therefore any kind of particles may be used as the inorganic and resin particles as long as the particles each can be electrically charged and electrophoretically migrated in the liquid phase dispersion medium 6 under an influence of an electric field.

The inorganic particles 5a may contain, for example, titanium oxide (titania), or a pigment, such as prussian blue, ultramarine blue, phthalocyanine blue, chrome yellow, cadmium yellow, lithopone, molybdate orange, fast yellow, benzimidazoline yellow, flavanthrone yellow, naphthol yellow, benzimidazoline orange, perinone orange, iron red, cadmium red, Madder Lake, naphthol red, dioxazine violet, alkali blue, cerulean blue, emerald green, phthalocyanine green, pigment green, cobalt green, or aniline black. Otherwise the inorganic particles may contain a compound, e.g. hydrozincite, barium sulfate, chromium oxide, calcium carbonate, gypsum, white lead, carbon black, or iron black.

Of these materials, the inorganic particles 5a may be made mainly from titanium oxide. Such titanium oxide-based inorganic particles 5a have a high whiteness degree and the particles have an especially-low cohesiveness with respect to the resin particles 5b.

In addition, surfaces of the inorganic particles 5a may have already undergone a process to increase the dispersibility thereof with respect to the liquid phase dispersion medium 6. This enhances the dispersibility of the inorganic particles 5a with respect to the liquid phase dispersion medium 6, and thus it becomes possible to reduce or prevent the aggregation with the resin particles 5b.

The surface treatment for the inorganic particles 5a may be a process by a surface-treating agent, such as a silane-based coupling agent, a titanate-based coupling agent, an aluminum-based coupling agent, or a zirconium-based coupling agent.

Especially, the titanate-based coupling agent ("KR TTS" manufactured by Ajinomoto Co., Inc.), and the aluminum-based coupling agent ("AL-M" manufactured by Ajinomoto Co., Inc.) may be used as the surface-treating agent.

The resin particles 5b may be particles produced by, for example, emulsion polymerization.

The resin materials, which the resin particles 5b can be made from, include acrylic resin, urethane-based resin, urea-based resin, epoxy-based resin, melamine resin, polystyrene, polyester, and divinylbenzene, for example. These materials may be used individually or in a combination of two or more kinds.

Of these materials, the materials containing acrylic resin as its main component are preferable for the resin material which the resin particles 5b are made from. The aggregation of the resin particles 5b with the inorganic particles 5a can be reduced or prevented by making the resin particles 5b mainly from acrylic resin.

Further, the above resin may have a molecular structure containing a polar group, such as a hydroxyl group, an amino group, or a carboxyl group. When such a polar group is introduced, the polar group is introduced in the molecular structure of the resin. Thus the resin is insolubilized with respect to the solvent. As a result, the resistance property of the resin particles 5b with respect to the liquid phase dispersion medium 6 can be increased.

From this point of view, the polar group may be at least one of a hydroxyl group and an amino group, and preferably an amino group.

In consideration of the foregoing, the resin may be an acrylic resin having, as its polar group, at least one of a hydroxyl group and an amino group.

Such acrylic resin can be obtained, for example, by copolymerizing an acrylic monomer having a polar group with an acrylic resin and introducing the polar group in the resin. This method makes it possible to obtain an acrylic resin having a polar group relatively readily at a high yield.

Appropriately setting the amount of the introduced polar group allows the adjustment of the electrification of the resin particles 5b in the liquid phase dispersion medium 6.

In addition, the resin particles 5b are dyed any one of red, green, blue, and black, for example, by mixing colorants of dye, pigment, etc. Thus, the electrophoretic display device 20 can display in the color of the inorganic particles 5a, the color of the resin particles 5b, and mixed colors thereof.

The average particle sizes of such inorganic particles 5a and resin particles 5b may satisfy the following relation. Specifically, when the inorganic particles 5a have an average particle size of A[µm] and the resin particles 5b have an average particle size of B[µm], it is preferable to satisfy a relation such that B/A falls in 1.5–200, and more preferably to satisfy a relation such that B/A falls in 5–50. Thus, it becomes possible to effectively reduce or prevent the aggregation of the inorganic particles 5a and resin particles 5b while maintaining the dispersibilities of the particles 5a, 5b in the liquid phase dispersion medium 6 suitably.

Concretely, the average particle size B of the resin particles 5b may be about 0.5–20 µm, and preferably 2–10 µm. When the average particle size B of the resin particles 5b is within the above range, the above-mentioned effect can be achieved more suitably. The effects, such as the effect of preventing the thickness of the electrophoretic display device 20 from being increased and the effect of preventing the reduction in production efficiency, can be achieved.

In the case where inorganic particles 5a have undergone surface treatment with a surfactant (the surfactant has been adsorbed on the surfaces of the inorganic particles 5a), when the average particle size B of the resin particles 5b is excessively small, the resin particles 5b can be trapped by hydrophobic chains of the surfactant. Thus the aggregation of the inorganic particles 5a and the resin particles 5b can occur. However, even in the case where the inorganic particles 5a have undergone surface treatment with a surfactant, the aggregation of the inorganic particles 5a and the resin particles 5b can be reduced or prevented effectively when the average particle size B of the resin particles 5b is equal to or larger than 0.5 µm (particularly, equal to or larger than 2 µm).

Also, from this point of view, the surface treatment of the inorganic particles 5a by a surfactant may be omitted.

The average particle size A of the inorganic particles 5a may be about 0.1–10 µm, and more preferably about 0.1–7.5 µm. Particularly it is preferable that the average particle size A is about 0.2–0.3 µm.

Further, the specific gravities of the particles 5a, 5b may be respectively set so that they are substantially equal to the specific gravity of the liquid phase dispersion medium 6. This allows the particles 5a, 5b to stay at fixed locations in the liquid phase dispersion 6 for a long time, even after the application of a voltage between the electrodes 3 and 4 has been stopped. The information displayed by the electrophoretic display device 20 is to be kept for a long time.

The insulative liquids may be used for the liquid phase dispersion medium 6. Such liquid phase dispersion mediums 6 include, for example, alcohols of methanol, ethanol, isopropanol, butanol, octanol, ethylene glycol, diethylene glycol, glycerin, etc., cellosolves of methyl cellosolve, ethyl cellosolve, phenyl cellosolve, etc., esters of methyl acetate, ethyl acetate, butyl acetate, ethyl formate, etc., ketones of acetone, methyl ethyl ketone, diethyl ketone, methyl isobutyl ketone, methyl isopropyl ketone, cyclohexanone, etc., aliphatic hydrocarbons (paraffinic hydrocarbons) of pentane, hexane, octane, etc., alicyclic hydrocarbons of cyclohexane, methylcyclohexane, etc., aromatic hydrocarbons of benzene, toluene, xylene, hexylbenzene, butylbenzene, octylbenzene, nonylbenzene, benzenes having long-chain alkyl groups (alkylbenzene derivatives) such as decylbenzene, undecylbenzene, dodecylbenzene, tridecylbenzene, and tetradecylbenzene, etc., halogenated hydrocarbons of methylene chloride, chloroform, carbon tetrachloride, 1,2-dichloroethane, etc., heterocyclic aromatic compounds of pyridine, pyrazine, furan, pyrrole, thiophene, methylpyrrolidone, etc., nitriles of acetonitrile, propionitrile, acrylonitrile, etc., amides of N,N-dimethylformamide, N,N-dimethylacetamide, etc., carboxylate, and other oils. These may be used separately or in a mixture thereof.

Of these substances, an alkylbenzene derivative (especially dodecylbenzene) is suitable for the liquid phase dispersion medium 6. An alkylbenzene derivative is preferable because the raw material thereof can be obtained at relatively low cost and readily and provides a high degree of safety.

To the liquid phase dispersion medium 6 (electrophoretic dispersion 10), various kinds of additives, i.e. a charging-control agent composed of particles of an electrolyte, a surfactant, a metal soap, a resin material, a rubber material, oils, a varnish, a compound, or the like, a dispersing agent of a titanium-based coupling agent, an aluminum-based coupling agent, a silane-based coupling agent, or the like, a lubricant, a stabilizing agent, etc. may be added on an as-needed basis, for example.

Further, in the liquid phase dispersion medium 6, any of an anthraquinone-based dye, an azo-based dye, an indigoid-based dye, a triphenylmethane-based dye, a pyrazolone-based dye, a stilbene-based dye, a diphenylmethane-based dye, a xanthene-based dye, an alizarin-based dye, an acridine-based dye, a quinonimine-based dye, a thiazole-based dye, a methine-based dye, a nitro-based dye, a nitroso-based dye, and the like may be dissolved on an as-needed basis.

In an electrophoretic display device 20 like this, when a TFT element 8 is turned on, a voltage is applied between the separate electrode 4X corresponding to the TFT element 8 in ON state and the first electrode 3. During this time, the particles 5a, 5b are each electrophoretically migrated toward one of the electrodes according to the electric field generated between the separate electrode 4X and the first electrode 3.

For example, in the case where the positively-charged inorganic particles 5a and negatively-charged resin particles 5b are used, when a separate electrode 4X is at a positive potential, the inorganic particles 5a are moved toward the first electrode 3 to be accumulated on the first electrode 3, whereas the resin particles 5b are moved toward the separate electrode 4X to be accumulated on the separate electrode 4X, as shown in FIG. 2A. Thus, viewing the electrophoretic display device 20 from above (i.e. from the display side), the color of the inorganic particles 5a is to be observed.

Conversely, when the separate electrode 4X is at a negative potential, the inorganic particles 5a are moved toward the separate electrode 4X to be accumulated on the separate electrode 4X, whereas the resin particles 5b are moved toward the first electrode 3 and then accumulated on the first electrode 3, as shown in FIG. 2B. Accordingly, viewing the electrophoretic display device 20 from above (i.e. from the display side), the color of the resin particles 5b is to be observed.

Therefore, desired information (picture image) can be displayed on the display side of the electrophoretic display device 20 according to combinations of the color of the inorganic particles 5a and the color of the resin particles 5b by turning each TFT element 8 on/off or applying a voltage between the corresponding separate electrode 4X and the first electrode 3, or setting the polarity of each separate electrode 4X appropriately.

An electrophoretic display device 20 like this can be manufactured, for example, as follows.

[A1] First, a first electrode 3 and TFT elements 8 and separate electrodes 4X (constituting a second electrode 4) are formed respectively on a first substrate 1 and on a second substrate 2 using the film-forming methods.

[A2] Second, the first substrate 1 with the first electrode 3 and the second substrate 2 with the TFT elements 8 and the separate electrodes 4X are bonded through a spacer 7.

In this step, a through-hole to fill an electrophoretic dispersion 10 into the sealed space 71 is formed in a portion of the spacer 7.

[A3] Next, the electrophoretic dispersion 10 is filled into the sealed space 71 through the through-hole and then the through-hole is sealed.

In the electrophoretic display device 20 as described above, the aggregation of the inorganic particles 5a and the resin particles 5b are reduced or prevented. Therefore, stable display performance can be offered for a long time.

Second Exemplary Embodiment

Now, a second exemplary embodiment of the electrophoretic display device of the invention will be described.

Figure 3:
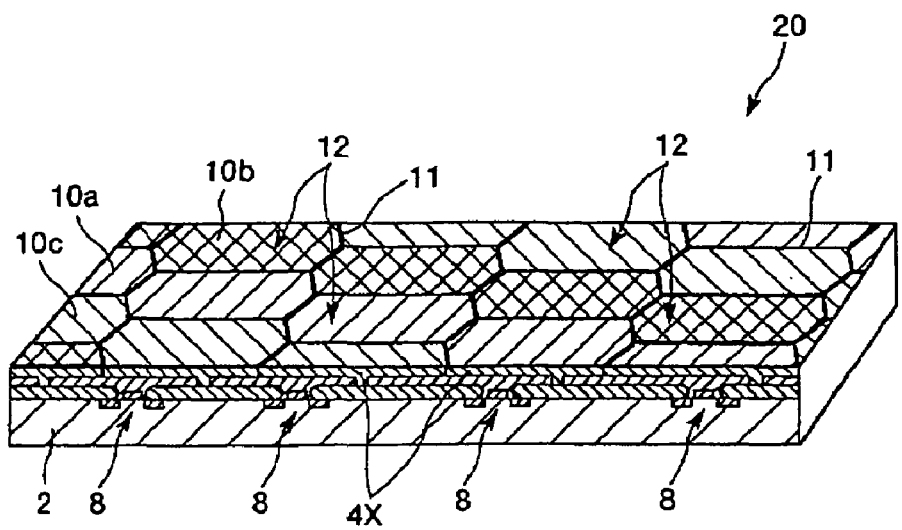
FIG. 3 is a schematic showing a second exemplary embodiment of the electrophoretic display device of the invention.
Figure 4:
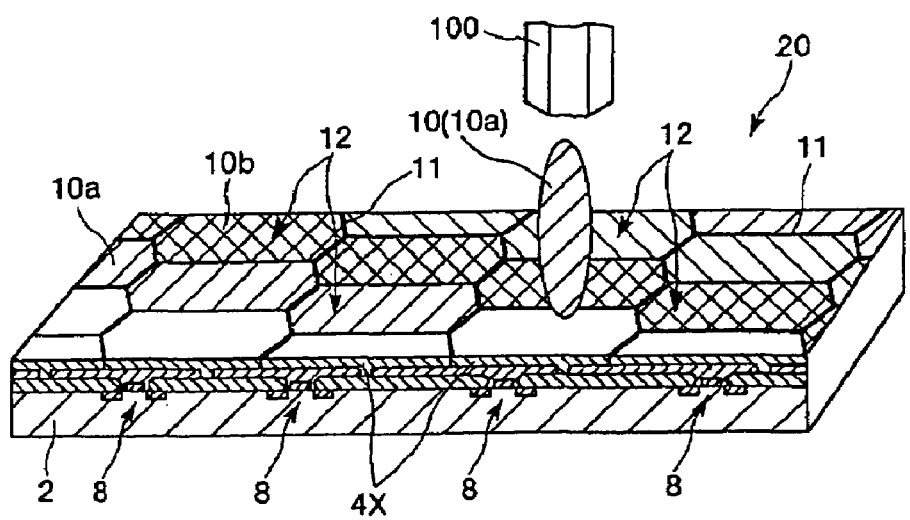
FIG. 4 is a schematic showing a step of a manufacturing process of the electrophoretic display device illustrated in FIG. 3.

FIG. 3 is a schematic showing (or partially showing) the second exemplary embodiment of the electrophoretic display device of the invention. FIG. 4 is an illustration showing a step of a manufacturing process of the electrophoretic display device illustrated in FIG. 3. In FIG. 3, the first substrate and the first electrode are omitted.

The electrophoretic display device of the second exemplary embodiment will be described below with the focus on the differences from the first exemplary embodiment, and the descriptions of like matters are to be omitted.

The electrophoretic display device 20 of the second exemplary embodiment is identical to the electrophoretic display device 20 of the first exemplary embodiment except that the electrophoretic dispersion 10 is distributed and placed in given places.

As shown in FIG. 3, in the second exemplary embodiment the separate electrodes 4X are each shaped into a hexagon in its two-dimensional shape and have partitions 11 provided upright along edge portions of the separate electrodes 4X. Thus, the partitions 11 have generally a honeycomb form.

In this configuration, spaces surrounded by partitions 11 (the spaces partitioned off) each constitute a cell space 12. Moreover, the cell spaces 12 are filled with an electrophoretic dispersion 10 as described above. The electrophoretic dispersion 10 is thus distributed.

As described above, each of the separate electrodes 4X is electrically connected with a TFT element 8. Accordingly, one TFT element 8 is provided for each of the cell spaces 12.

As the constitutive material of the partitions 11, the resin materials (hardening resins), e.g. epoxy-based resin, silicon resin, melamine-based resin, urea-based resin, acrylic resin, and phenol resin, may be used individually or in a combination of two or more kinds.

In addition, the height of the partitions 11 is set to an inter-electrode distance as described above.

In the second exemplary embodiment, the cell spaces 12 slantwise arrayed in a line are filled with the electrophoretic dispersion 10 containing resin particles 5b having the same color. Specifically, a line composed of a series of cell spaces 12 filled with a red electrophoretic dispersion 10a, a line composed of a series of cell spaces 12 filled with a green electrophoretic dispersion 10b, and a line composed of a series of cell spaces 12 filled with a blue electrophoretic dispersion 10c, are cyclically provided in turn.

This configuration allows the electrophoretic display device 20 of the second exemplary embodiment to display a set of desired information (a picture image) in multiple colors (in color).

An electrophoretic display device 20 like this can be manufactured, for example, as follows.

[B1] The same step as the above step [A1] is carried out.

Next, partitions 11 are formed along the edge portions of the separate electrodes 4X. The partitions 11 may be formed, for example, by: a method by which a liquid containing a hardening resin precursor is supplied by a coating method (ink-jet method, printing, etc.) and then hardened; or a photolithography.

Then, spaces surrounded by the partitions 11 (cell spaces 12) are filled with an electrophoretic dispersion 10. While various methods may be used to fill the cell spaces 12 with the electrophoretic dispersion 10 the process may be performed by a process using a dispenser or the ink-jet method. According to such method, the electrophoretic dispersion 10 can be filled into the cell spaces 12 more readily and reliably.

FIG. 4 shows a method of filling the electrophoretic dispersion 10 into the cell spaces 12 by the ink-jet method. As shown by the drawing, in the ink-jet method, the electrophoretic dispersion 10 (dispersion ink for electrophoretic display devices) is discharged from an end portion of a nozzle 100 as a droplet, and the droplet impinges on the separate electrode 4X. The discharge operation is carried out for each cell space 12 (separate electrode 4X), whereby the cell spaces 12 are filled with the electrophoretic dispersion 10 (10a for red, 10b for green, 10c for blue).

[B2] Next, the first substrate 1 with the first electrode 3 and the second substrate 2 with the TFT elements 8, the separate electrodes 4X, the partitions 11, and the electrophoretic dispersion 10 are bonded through the spacer 7.

In this exemplary embodiment, the partitions 11 can be enhanced so that it has the same function as that of the spacer 7. In this case, the spacer 7 may be omitted if required.

Also the electrophoretic display device 20 of the second exemplary embodiment can provide the same effect and advantage as those of the first exemplary embodiment.

Third Exemplary Embodiment

Now, a third exemplary embodiment of the electrophoretic display device of the invention will be described.

Figure 5:
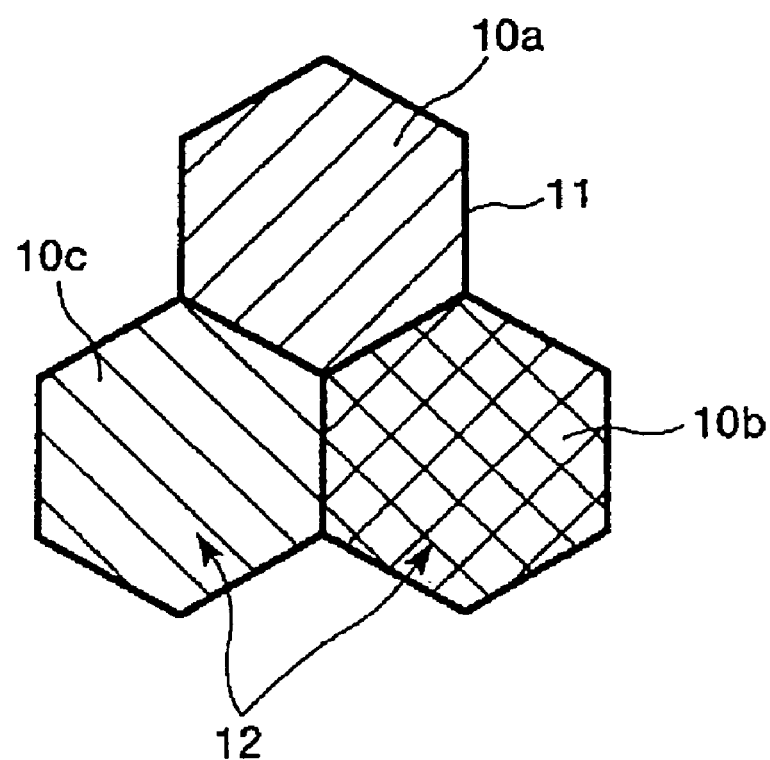
FIG. 5 is a schematic showing a third exemplary embodiment of the electrophoretic display device of the invention.

FIG. 5 is a schematic showing (or partially showing) the third exemplary embodiment of the electrophoretic display device of the invention.

The electrophoretic display device of the third exemplary embodiment will be described below with the focus on the differences from the first and second exemplary embodiments, and the descriptions of like matters are to be omitted.

The electrophoretic display device 20 of the third exemplary embodiment is identical to the electrophoretic display device 20 of the second exemplary embodiment except for the layout pattern of the electrophoretic dispersion 10.

As shown in FIG. 5, in the electrophoretic display device 20 of the third exemplary embodiment, three cell spaces 12 adjacent to each other are respectively filled with a red electrophoretic dispersion 10a, a green electrophoretic dispersion 10b, and a blue electrophoretic dispersion 10c.

In such configuration, a combination of three cell spaces 12 constitutes one pixel.

In an electrophoretic display device 20 like this, I: in the condition where all of red (R), green (G), and blue (B) are displayed, the pixel is changed into black, II: in the condition where the one of red, green, and blue is displayed, the pixel is changed into the one color, III: in the condition where any two of red, green, and blue are displayed, the pixel is of a mixed color of the two colors, IV: in the case where all of the colors are not displayed, the pixel is changed into white when the inorganic particles are of white (titania particles, for example). The electrophoretic display device 20 of the third exemplary embodiment is thus capable of providing display in multiple colors.

Also the electrophoretic display device 20 of the third exemplary embodiment can provide the same effect and advantage as those of the first and second exemplary embodiments.

Fourth Exemplary Embodiment

Now, a fourth exemplary embodiment of the electrophoretic display device of the invention will be described.

Figure 6:
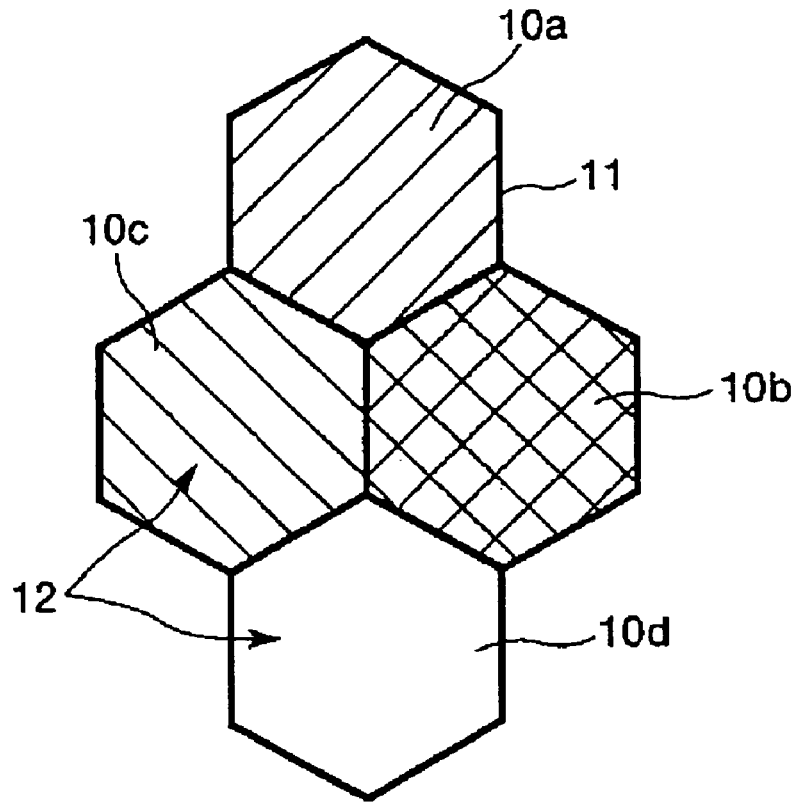
FIG. 6 is a schematic showing a fourth exemplary embodiment of the electrophoretic display device of the invention.

FIG. 6 is a schematic showing (or partially showing) the fourth exemplary embodiment of the electrophoretic display device of the invention.

The electrophoretic display device of the fourth exemplary embodiment will be described below with the focus on the differences from the first to third exemplary embodiments, and the descriptions of like matters are to be omitted.

The electrophoretic display device 20 of the fourth exemplary embodiment is identical to the electrophoretic display device 20 of the third exemplary embodiment except that four kinds of electrophoretic dispersions 10 are used.

As shown in FIG. 6, in the electrophoretic display device 20 of the fourth exemplary embodiment, adjacent four cell spaces 12 are respectively filled with a red electrophoretic dispersion 10a, a green electrophoretic dispersion 10b, a blue electrophoretic dispersion 10c, and a black electrophoretic dispersion 10d.

In such a configuration, a combination of four cell spaces 12 constitutes one pixel.

This configuration allows the electrophoretic display device 20 to make black more brilliant in displayed information (a picture image).

Also the electrophoretic display device 20 of the fourth exemplary embodiment can provide the same effect and advantage as those of the first to third exemplary embodiments.

Fifth Exemplary Embodiment

Now, a fifth exemplary embodiment of the electrophoretic display device of the invention will be described.

Figure 7:
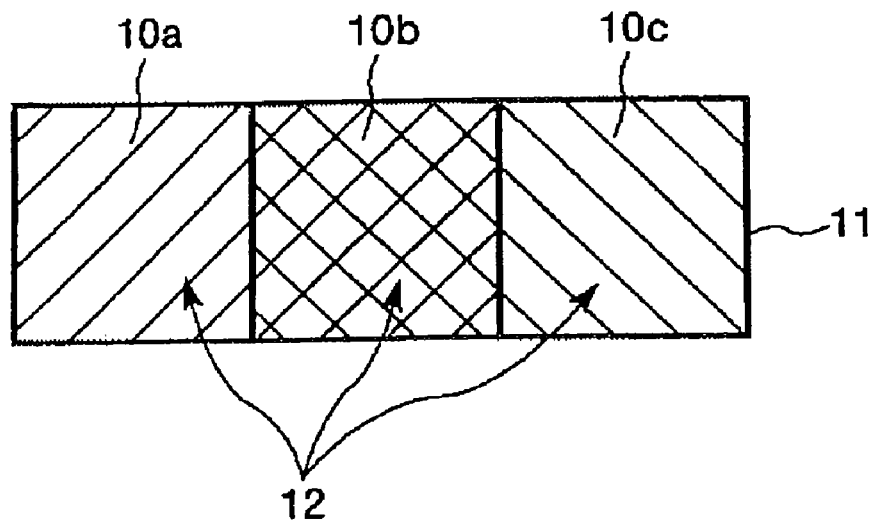
FIG. 7 is a schematic showing a fifth exemplary embodiment of the electrophoretic display device of the invention.

FIG. 7 is a schematic showing (or partially showing) the fifth exemplary embodiment of the electrophoretic display device of the invention.

The electrophoretic display device of the fifth exemplary embodiment will be described below with the focus on the differences from the first and second exemplary embodiments, and the descriptions of like matters are to be omitted.

The electrophoretic display device 20 of the fifth exemplary embodiment is identical to the electrophoretic display device 20 of the second exemplary embodiment except for the general shape of the partitions 11.

As shown in FIG. 7, in the electrophoretic display device 20 of the fifth exemplary embodiment, the separate electrodes 4X (and cell spaces 12) are each shaped into a square in its two-dimensional shape, and the partitions 11 are generally shaped into a grid pattern.

In this configuration, continuously-arranged three cell spaces 12 are respectively filled with a red electrophoretic dispersion 10a, a green electrophoretic dispersion 10b, and a blue electrophoretic dispersion 10c.

In such configuration, a combination of three cell spaces 12 constitutes one pixel.

Also the electrophoretic display device 20 of the fifth exemplary embodiment can provide the same effect and advantage as those of the first and second exemplary embodiments.

Sixth Exemplary Embodiment

Now, a sixth exemplary embodiment of the electrophoretic display device of the invention will be described.

Figure 8:
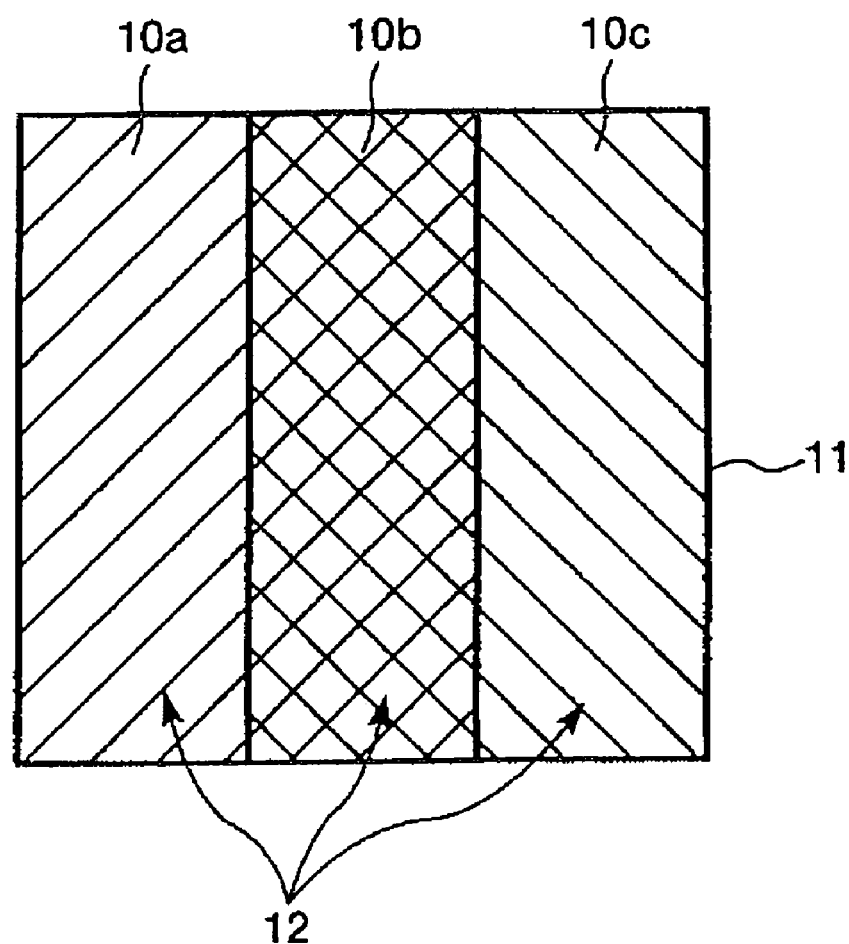
FIG. 8 is a schematic showing a sixth exemplary embodiment of the electrophoretic display device of the invention.

FIG. 8 is a schematic showing (or partially showing) the sixth exemplary embodiment of the electrophoretic display device of the invention.

The electrophoretic display device of the sixth exemplary embodiment will be described below with the focus on the differences from the first, second and fifth exemplary embodiments, and the descriptions of like matters are to be omitted.

The electrophoretic display device 20 of the sixth exemplary embodiment is identical to the electrophoretic display device 20 of the fifth exemplary embodiment except for the general shape of the partitions 11.

As shown in FIG. 8, in the electrophoretic display device 20 of the sixth exemplary embodiment, the separate electrodes 4X (and cell spaces 12) are each shaped into a rectangle in its two-dimensional shape, and the partitions 11 are generally shaped into a grid pattern.

Also the electrophoretic display device 20 of the sixth exemplary embodiment can provide the same effect and advantage as those of the first, second, and fifth exemplary embodiments.

Seventh Exemplary Embodiment

Now, a seventh exemplary embodiment of the electrophoretic display device of the invention will be described.

Figure 9:
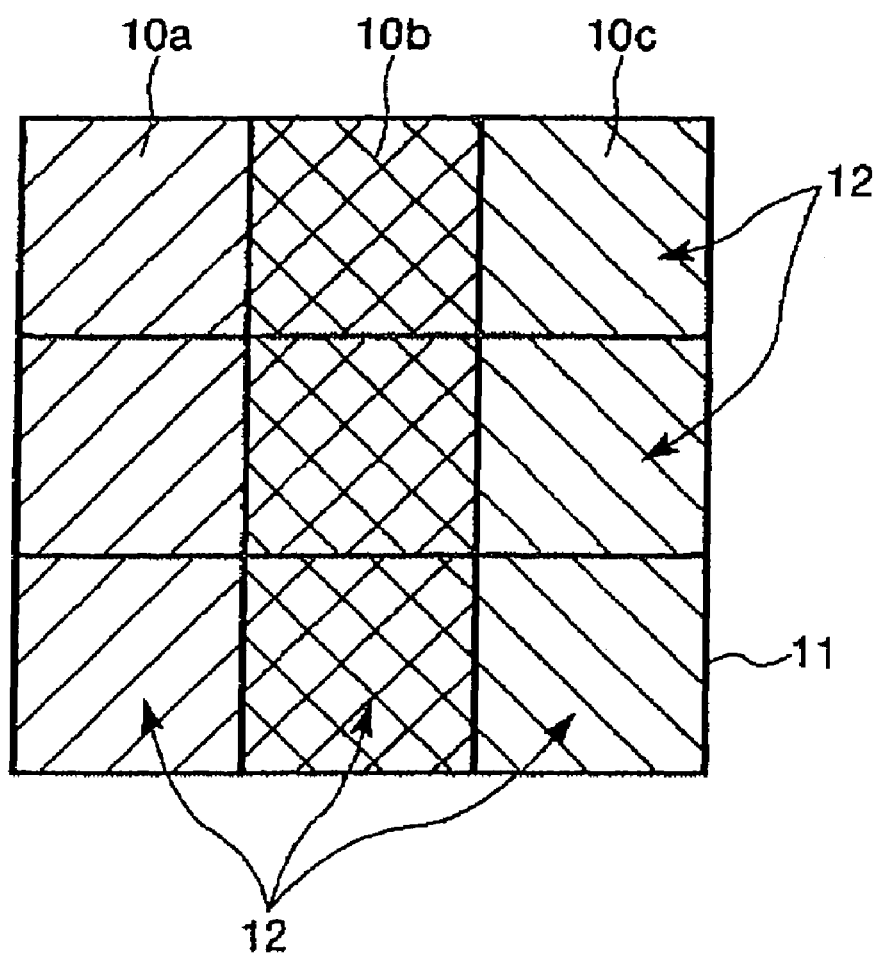
FIG. 9 is a schematic showing a seventh exemplary embodiment of the electrophoretic display device of the invention.

FIG. 9 is a schematic showing (or partially showing) the seventh exemplary embodiment of the electrophoretic display device of the invention.

The electrophoretic display device of the seventh exemplary embodiment will be described below with the focus on the differences from the first, second and fifth exemplary embodiments, and the descriptions of like matters are to be omitted.

The electrophoretic display device 20 of the seventh exemplary embodiment is identical to the electrophoretic display device 20 of the fifth exemplary embodiment except for the constitutive unit of one pixel.

As shown in FIG. 9, in the electrophoretic display device 20 of the seventh exemplary embodiment, a combination of 3×3 cell spaces 12 (nine cell spaces in total) constitute one pixel.

Such configuration allows the electrophoretic display device 20 to display an image by an area ratio gray-scale method and to display an image with a 4-step gradation, which makes it possible to display a set of information (a picture image) further nearly in full color.

Also the electrophoretic display device 20 of the seventh exemplary embodiment can provide the same effect and advantage as those of the first, second, and fifth exemplary embodiments.

Eighth Exemplary Embodiment

Now, an eighth exemplary embodiment of the electrophoretic display device of the invention will be described.

Figure 10:
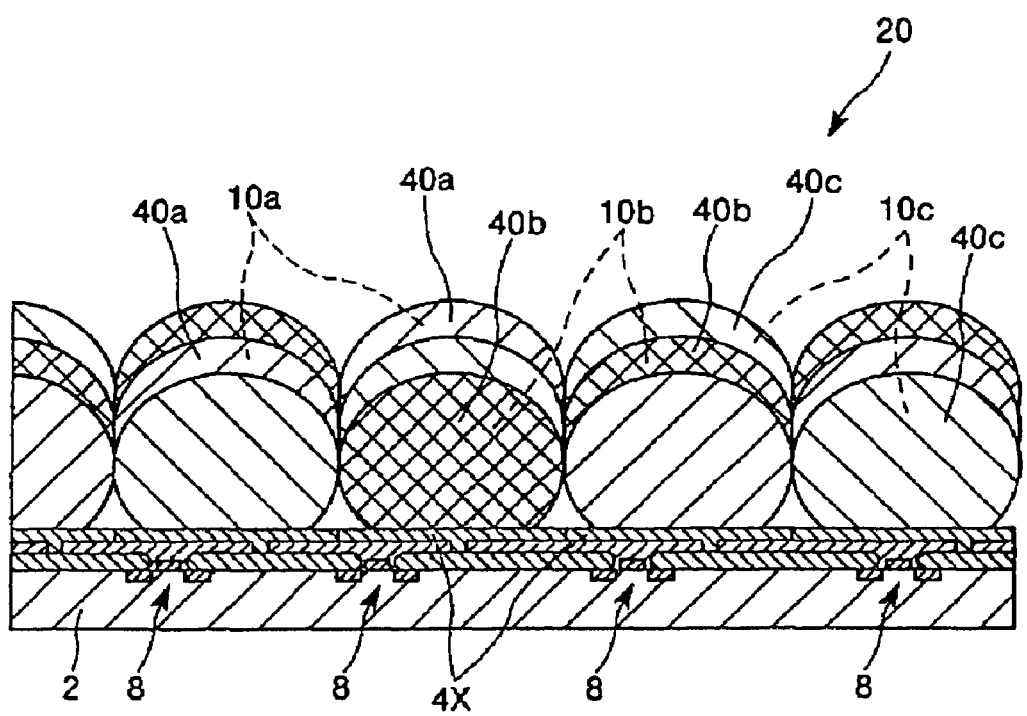
FIG. 10 is a schematic showing an eighth exemplary embodiment of the electrophoretic display device of the invention.

FIG. 10 is a schematic showing (or partially showing) the eighth exemplary embodiment of the electrophoretic display device of the invention. In FIG. 10, the first substrate and first electrode are omitted.

The electrophoretic display device of the eighth exemplary embodiment will be described below with the focus on the differences from the first and second exemplary embodiments, and the descriptions of like matters are to be omitted.

The electrophoretic display device 20 of the eighth exemplary embodiment is identical to the electrophoretic display device 20 of the second exemplary embodiment except that the electrophoretic dispersion 10 is encapsulated in microcapsules 40.

As shown in FIG. 10, in the electrophoretic display device 20 of the eighth exemplary embodiment, a line composed of a series of red microcapsules 40a encapsulating a red electrophoretic dispersion 10a, a line composed of a series of green microcapsules 40b encapsulating a green electrophoretic dispersion 10b, and a line composed of a series of microcapsules 40c encapsulating a blue electrophoretic dispersion 10c, are cyclically provided in turn.

The constitutive materials for the microcapsules 40 (40a–40c) are not particularly limited, but the materials include, for example, various kinds of resin materials, such as a composite material of acacia gum and gelatin, urethane-based resin, melamine-based resin, urea resin, polyamide, and polyether. These materials may be used individually or in a combination of two or more kinds.

The preparation technique of the microcapsules 40 (i.e. the method of encapsulating the electrophoretic dispersion 10 in the microcapsules 40) is not particularly limited, but various encapsulation techniques, e.g. interface polymerization, in-situ polymerization, phase isolation (or coacervation), interface precipitation, and spray drying, may be used as the preparation technique. The above-described encapsulation techniques may be appropriately selected according to the constitutive material of the microcapsules 40, etc.

Microcapsules 40 like this may be substantially uniform in size. This allows the electrophoretic display device 20 to offer better display performance. The microcapsules 40 of a uniform size can be obtained, for example, by filtration or specific gravity difference classification.

The size (average particle size) of the microcapsules 40 is not particularly limited, but may be about 10–150 µm, and preferably about 30–100 µm, generally.

A binder material may be supplied in periphery portions of the microcapsules 40 in a gap between the first electrode 3 and the second electrode 4.

The binder material is to be supplied, for example, for the purposes of fixing the microcapsules 40, keeping the insulating property between the electrodes 3 and 4, etc. Thus, the durability and reliability of the electrophoretic display device 20 can be further increased.

For the binder material, resin materials superior in its affinity (adhesion) with respect to the electrodes 3, 4 and microcapsules 40 and in its insulating property are may be used.

The resin materials are not particularly limited, but they include, for example, polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acryl ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, thermoplastic resins, such as cellulose-based resin, polyamide-based resins, polyacetal, polycarbonate, polyethylene terephthalate, polybutylene terephthalate, polyphenylene oxide, polysulfone, polyamideimide, polyaminobismaleimide, polyether sulfone, polyphenylene sulfone, polyarylate, graft polymerized polyphenylene ether, poly(ether-ether-ketone), polymeric materials such as polyether imide, polytetrafluoroethylene, polyfluoroethylenepropylene, tetrafluoroethyleneperfluoroalkoxyethylene copolymer, ethylene-tetrafluoroethylene copolymer, poly (vinylidene fluoride), polytrifluoroethylene chloride, fluorine-based resins of fluororubber, etc., silicone-based resins, and silicone resins of silicone rubber, etc., in addition to methacrylic acid-styrene copolymer, polybutylene, and methyl methacrylate-butadiene-styrene copolymer. These materials may be used individually or in a combination of two or more kinds.

The binder material may be set to have a dielectric constant substantially equal to that of the liquid phase dispersion medium 6. Therefore, a dielectric constant regulant of, for example, an alcohol such as 1,2-butanediol, or 1,4-butanediol, a ketone, or carboxylate, may be added into the binder material.

An electrophoretic display device 20 like this can be manufactured, for example, as follows.

[C1] The same step as in the step [A1] is carried out.

Next, an adhesive is supplied on a target separate electrode 4X (second electrode 2), followed by supplying, for example, red microcapsules 40a and hardening the adhesive thereby to fix the microcapsules 40a on the separate electrode 4X. Thus, the microcapsules 40a are electrically connected to the intended TFT element 8.

This operation (step) is repeated the number of times depending on the kinds of the microcapsules 40 of different colors (40b, 40c).

According to such method, the microcapsules 40 can be placed on the second substrate 2 more readily and reliably.

[C2] Next, the first substrate 1 with the first electrode 3 is superposed on the second substrate and bonded therewith so that the first electrode 3 contacts the microcapsules 40.

Also the electrophoretic display device 20 of the eighth exemplary embodiment can provide the same effect and advantage as those of the first and second exemplary embodiments.

Now, it is noted that the layout patterns of the third to seventh exemplary embodiments may be applied to layout patterns for the microcapsules 40 (40a, 40b, and 40c).

Ninth Exemplary Embodiment

Now, a ninth exemplary embodiment of the electrophoretic display device of the invention will be described.

Figure 11:
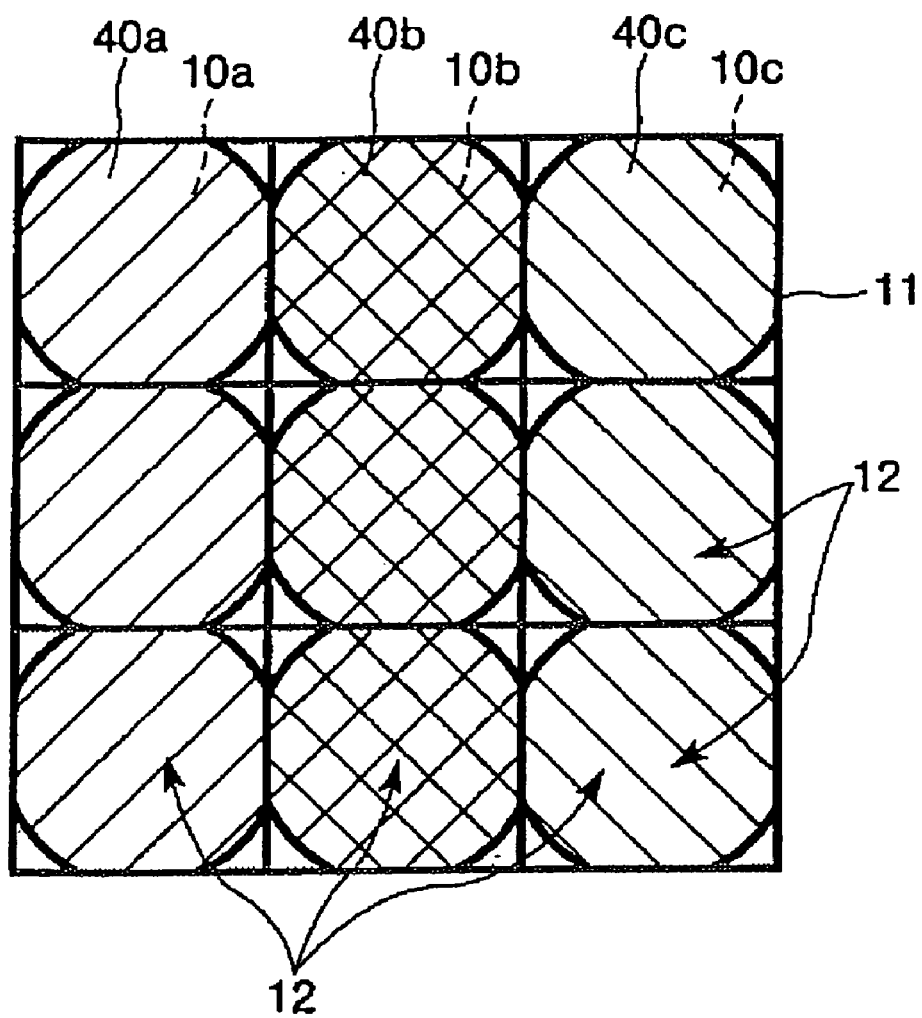
FIG. 11 is a schematic showing a ninth exemplary embodiment of the electrophoretic display device of the invention.

FIG. 11 is a schematic showing (or partially showing) the ninth exemplary embodiment of the electrophoretic display device of the invention.

The electrophoretic display device of the ninth exemplary embodiment will be described below with the focus on the differences from the first, seventh and eighth exemplary embodiments, and the descriptions of like matters are to be omitted.

The electrophoretic display device 20 of the ninth exemplary embodiment is identical to the electrophoretic display devices 20 of the seventh and eighth exemplary embodiments except that the microcapsules 40 are contained (or accommodated) in the cell spaces 12.

The electrophoretic display device 20 of the ninth exemplary embodiment is a combination of the configurations of the electrophoretic display device 20 of the seventh exemplary embodiment and the electrophoretic display device 20 of the eighth exemplary embodiment.

Such configuration allows the microcapsules 40 to be placed in position more precisely.

Also the electrophoretic display device 20 of the ninth exemplary embodiment can provide the same effect and advantage as those of the first, seventh, and eighth exemplary embodiments.

Tenth Exemplary Embodiment

Now, a tenth exemplary embodiment of the electrophoretic display device of the invention will be described.

Figure 12:
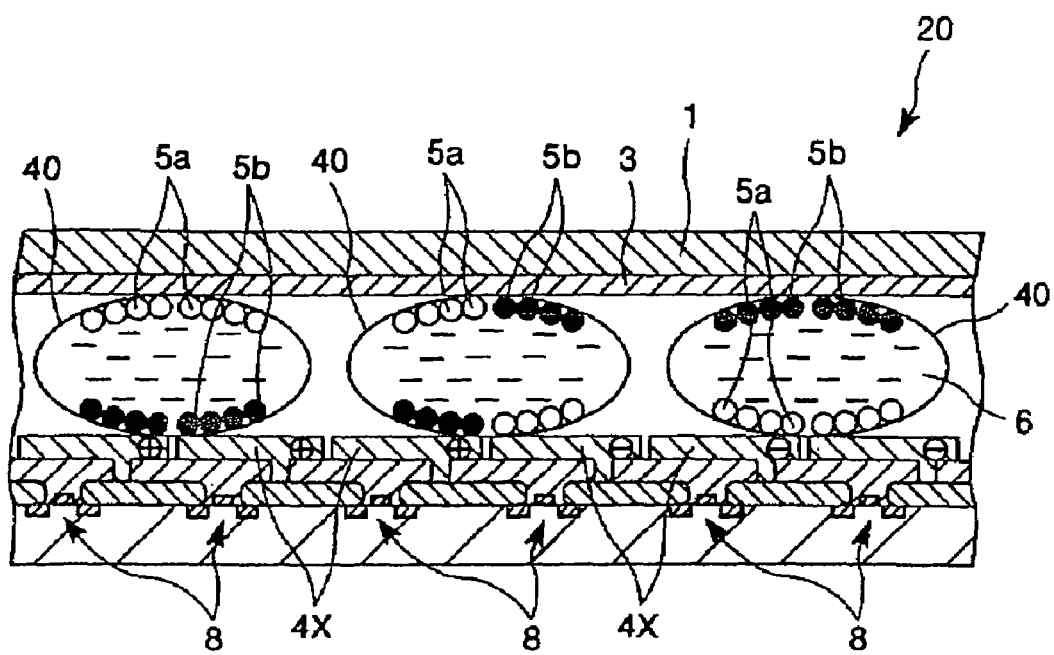
FIG. 12 is a longitudinal cross-sectional schematic showing a tenth exemplary embodiment of the electrophoretic display device of the invention.

FIG. 12 is a longitudinal cross-sectional schematic showing (or partially showing) the tenth exemplary embodiment of the electrophoretic display device of the invention.

The electrophoretic display device of the tenth exemplary embodiment will be described below with the focus on the differences from the first and eighth exemplary embodiments, and the descriptions of like matters are to be omitted.

The electrophoretic display device 20 of the tenth exemplary embodiment is identical to the electrophoretic display device 20 of the eighth exemplary embodiment except that one microcapsule 40 is placed on two separate electrodes 4X.

In such a electrophoretic display device 20, as shown in FIG. 12, the electrophoretic display device 20 is viewed from above (i.e. from the display side), the color of the inorganic particles 5a (white) for the left side microcapsule 40, the color resulting from the mix in colors of the inorganic particles 5a and the resin particles 5b (a secondary color) for the center microcapsule 40, and the color of the resin particles 5b (not colorless) for the right side microcapsule 40 are respectively to be observed depending on combinations of the polarities of the separate electrodes 4X.

This configuration allows electrophoretic display device 20 to display an image with a higher-level gray scale.

Also the electrophoretic display device 20 of the tenth exemplary embodiment can provide the same effect and advantage as those of the first and eighth exemplary embodiments.

Electrophoretic display devices 20 as described above can be incorporated in various electronic systems. The electronic system of an aspect of the invention, which has such electrophoretic display device 20, will be described below.

Electronic Paper

Now, an exemplary embodiment in the case where the electronic system of an aspect of the invention is applied to an electronic paper will be described.

Figure 13:
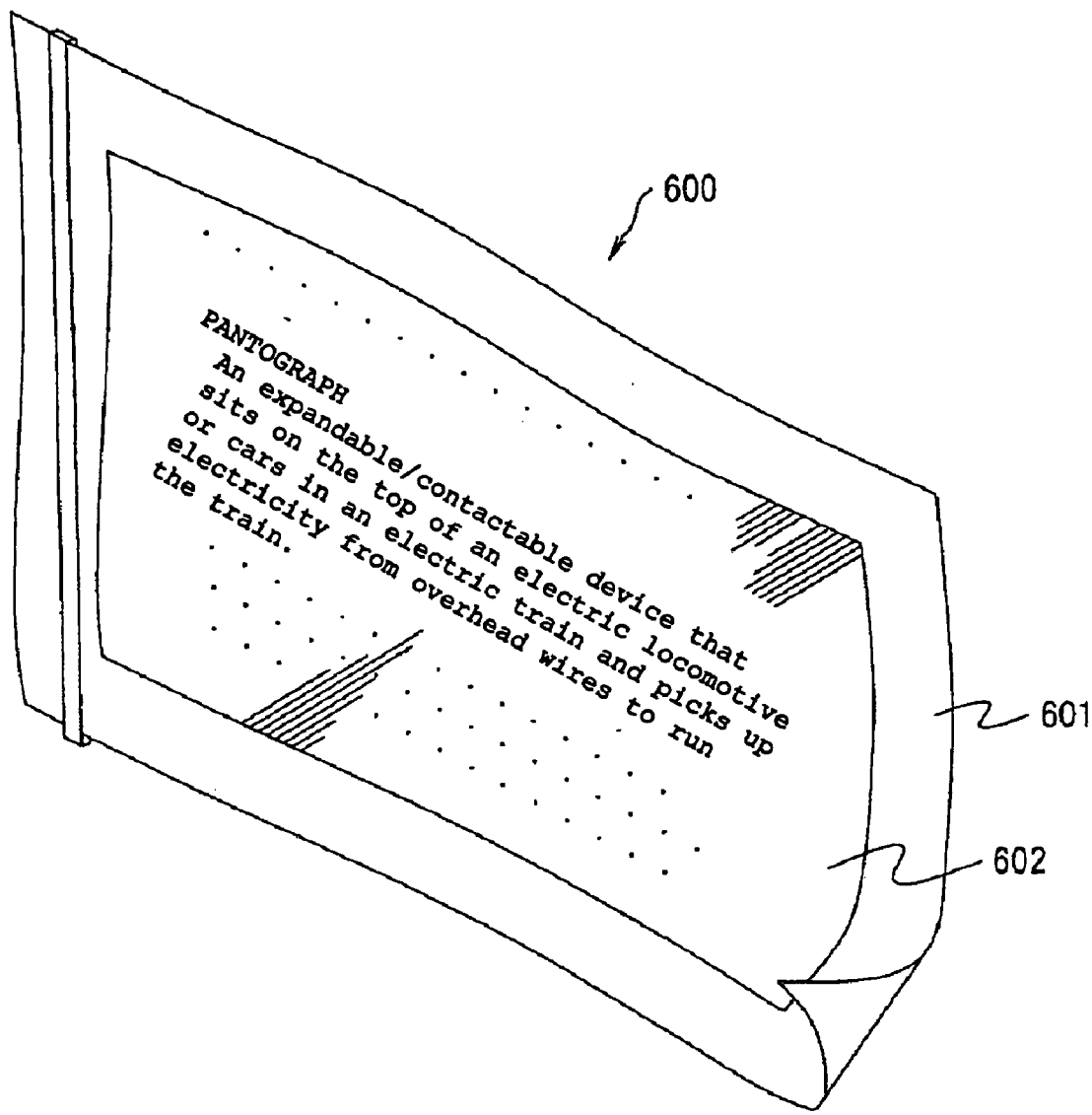
FIG. 13 is a schematic showing an exemplary embodiment in the case where the electronic system of the invention is applied to an electronic paper.

FIG. 13 is a schematic showing an exemplary embodiment in the case where the electronic system of an aspect of the invention is applied to an electronic paper.

The electronic paper 600 illustrated in FIG. 13 includes a main body 601 composed of a rewritable sheet having a paper-like texture and flexibility, and a display unit 602.

In such electronic paper 600, the display unit 602 is composed of an electrophoretic display device 20 as described above.

Display

Now, an exemplary embodiment in the case where the electronic system of the invention is applied to a display will be described.

Figure 14A:
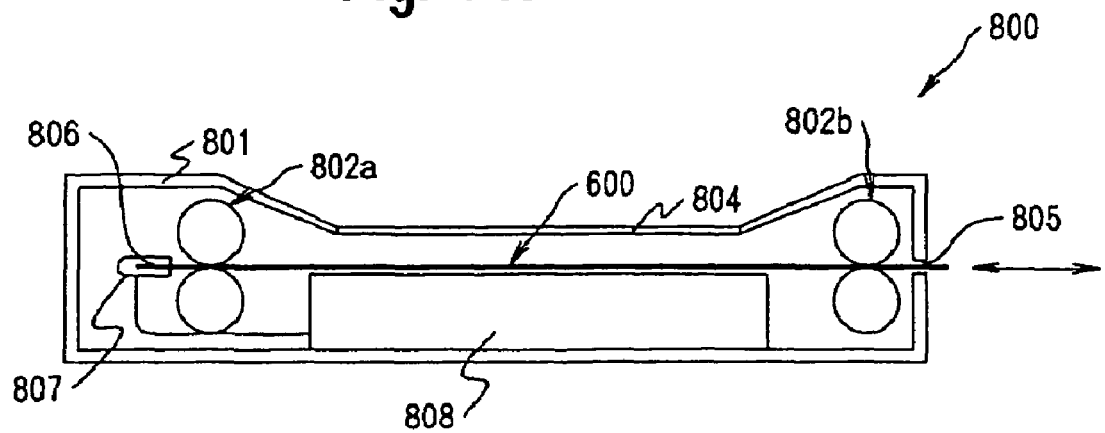
FIGS. 14a and 14b are schematics showing an exemplary embodiment in the case where the electronic system of the invention is applied to a display.
Figure 14B:
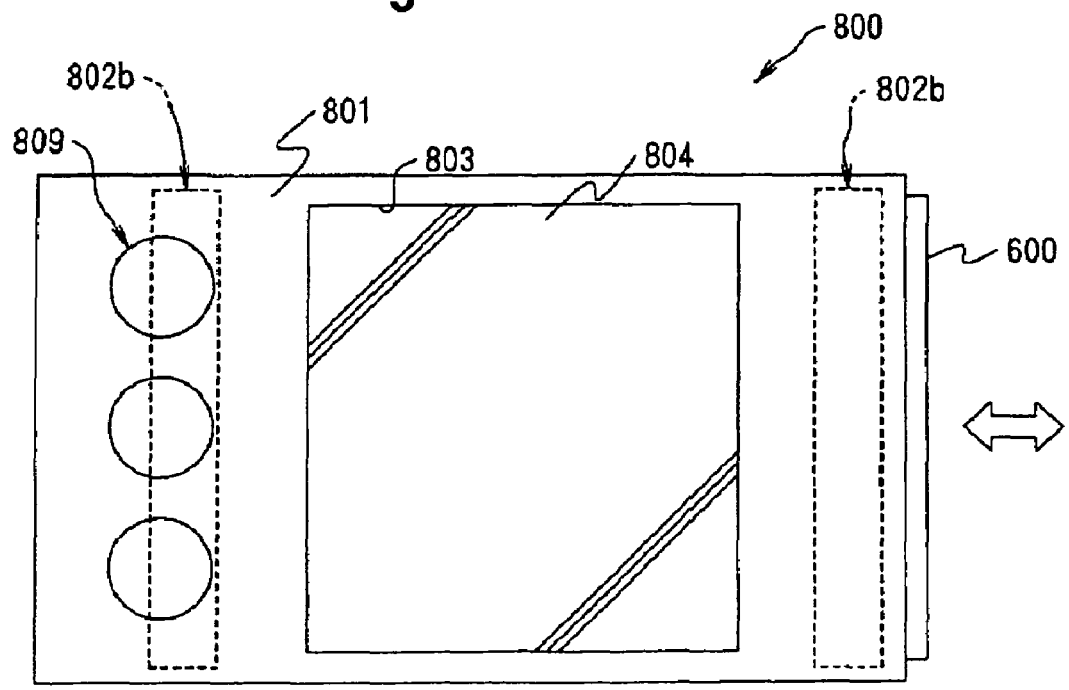
Figure 15:
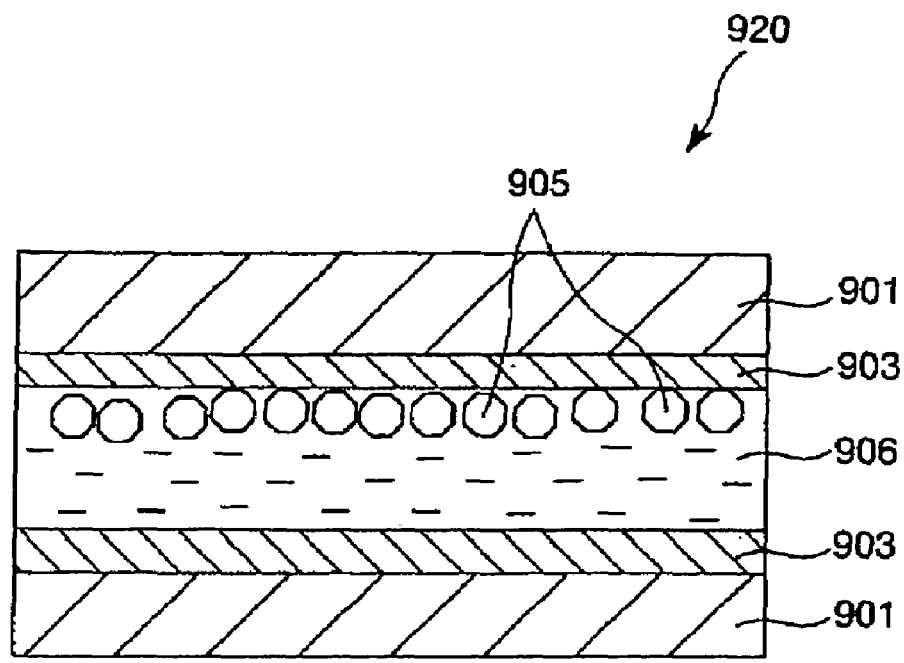
FIG. 15 is a longitudinal cross-sectional schematic showing the operational principle of a related art electrophoretic display device.

FIGS. 14A and 14B are each an illustration showing an exemplary embodiment in the case where the electronic system of the invention is applied to a display. Of these drawings, FIG. 14A is a cross-sectional schematic and FIG. 14B is a schematic.

The display (display device) 800, illustrated in FIGS. 14A and 14B, includes a main body section 801 and an electronic paper 600 removably provided on the main body section 801. The electronic paper 600 is of the above-described configuration, and is the same as the electronic paper illustrated in FIG. 13 in its configuration.

The main body section 801 has an inlet 805 formed in a side portion thereof (on the right side of FIGS. 14A, 14B), and two pairs of transporting rollers 802a, 802b provided inside the body section. From the inlet the electronic paper 600 can be inserted. When the electronic paper 600 is inserted in the main body section 801 through the inlet 805, the electronic paper 600 is attached to the main body section 801 a the condition where the paper is held by the pairs of transporting rollers 802a, 802b therebetween.

Also, the main body section 801 has a rectangular opening 803 formed on the display side thereof (on the near side of the drawing sheet of FIG. 14B). A transparent glass panel 804 is fitted in the opening 803. Thus, it becomes possible to visually identify the electronic paper 600 attached to the main body section 801, from the outside of the main body section 801. That is to say, in the display 800 the display side is arranged so that the electronic paper 600 attached to the main body section 801 is visually identified through the transparent glass panel 804.

The electronic paper 600 has a terminal section 806 provided in a leading end portion in the insert direction of the electronic paper 600 (on the left side of FIGS. 14A, 14B). The main body section 801 has a socket 807 provided inside, to which the terminal section 806 is connected in the condition where the electronic paper 600 is attached to the main body section 801. A controller 808 and an operation section 809 are electrically connected to the socket 807.

In the display 800, the electronic paper 600 is removably attached to the main body section 801. Therefore it can be detached from the main body section 801, carried like that, and used.

Also, in a display 800 like this, the electronic paper 600 is composed of an electrophoretic display device 20 as described above.

The electronic system of an aspect of the invention is not limited to the above application. Its applications may include, for example, a television set, a digital still camera, viewfinder type and direct-monitoring type video tape recorders, a car navigation system, a pager, an electronic datebook, an electronic calculator, an electronic newspaper, an electronic book, an electronic notebook, a word processor, a personal computer, a workstation, a cell phone, a picture telephone, a POS terminal, and a system with a touch panel. The electrophoretic display device 20 of an aspect of the invention can be applied to the display sections of these electronic systems.

While the electrophoretic dispersion, electrophoretic display device, the method of manufacturing the electrophoretic display device, and the electronic system of an aspect of the invention have been described above based on the exemplary embodiments shown in the drawings, the invention is not limited to the exemplary embodiments.

The electrophoretic display device of an aspect of the invention may be a device produced by combining any two or more of the first to tenth exemplary embodiments in their configurations (features).

While in the exemplary embodiments the devices having a configuration such that a pair of electrodes are provided opposite each other have been shown, the electrophoretic display device of an aspect of the invention may be applied to an electrophoretic display device having a configuration such that a pair of electrodes are provided on the same substrate.

EXAMPLES

Examples of an aspect of the invention are described below.

Example 1

1. Preparation of the Electrophoretic Dispersion

A red electrophoretic dispersion was prepared by ultrasonically dispersing 8 g of acrylic particles colored red ("CHEMISNOW," manufactured by Soken Chemical & Engineering Co., Ltd.) and 8 g of titania particles ("CR-90," manufactured by Ishihara Sangyo Kaisha, Ltd.) in 80 ml of dodecylbenzene, the titania particles being processed with a surface-treating agent manufactured by Ajinomoto Co., Inc.

The acrylic particles having an average particle size of 4 µm and the titania particles having an average particle size of 0.2–0.3 µm were used here.

In the same way, a green electrophoretic dispersion and a blue electrophoretic dispersion were prepared.

"CHEMISNOW," manufactured by Soken Chemical & Engineering Co., Ltd. were used for the acrylic particles colored green, and also "CHEMISNOW," manufactured by Soken Chemical & Engineering Co., Ltd. were used for the acrylic particles colored blue.

2. Manufacturing of the Electrophoretic Display Device

First, a substrate having thin film transistor elements (TFT glass substrate) was obtained. The substrate was prepared by the same process as that for preparing TFT substrates used to manufacture liquid crystal displays.

Then, a photoresist layer was formed by coating a resist material on the TFT glass substrate, exposing and developing the resist material. Grooves arranged in an intended partition pattern (a grid pattern illustrated in FIG. 7) were thus formed in the photoresist layer.

Next, the grooves were supplied with a two-part curable silicone resin (containing two components "TSE 3450(A)" and "TSE 3450(B)" manufactured by Toshiba Silicones) and the resin was then cured. Thereafter, the resulting photoresist layer was exfoliated and removed from the substrate, whereby partitions extending upward from the substrate were formed.

The partitions had a height of 30 µm and a width of 10 µm and were two-dimensionally arranged at a pitch of 100 µm.

Then, the red, green, blue electrophoretic dispersions were filled in the corresponding spaces defined by the partitions (cell spaces) with a layout pattern illustrated in FIG. 7 using an ink-jet device (i.e. a commercial ink-jet printer which had been modified).

Next, a glass substrate with an ITO layer on an entire surface thereof was placed over the cell spaces, and then the periphery portion of the paired substrates was sealed with an epoxy resin ("ARALBOND," manufacture by Ciba-Geigy Japan Ltd.) while forces were applied to the substrates. Thus, the electrophoretic display device was obtained.

When the terminal section of the resulting electrophoretic display device was coupled with a power source through lines to try activating the device, the display device could be activated in multiple colors including black, red, green, blue, and white. Also, the display device could be activated in a secondary color produced by these colors.

Example 2

The electrophoretic display device was manufactured by the same process as that of Example 1 except that the partitions were different in shape and electrophoretic dispersions of four colors were used.

1. Preparation of the Electrophoretic Dispersion

In the same way as in Example 1, a red electrophoretic dispersion, green electrophoretic dispersion, blue electrophoretic dispersion, and black electrophoretic dispersion were prepared.

For the acrylic particles colored black, "CHEMISNOW" manufactured by Soken Chemical & Engineering Co., Ltd. was used.

2. Manufacturing of the Electrophoretic Display Device

The partitions were shaped into a honeycomb form as illustrated in FIG. 6. Then the red, green, blue, and black electrophoretic dispersions were filled in cell spaces with the layout pattern illustrated in FIG. 6.

As a result, an electrophoretic display device superior in display in black to that in Example 1 could be obtained.

Example 3

1. Preparation of Microcapsules

Each electrophoretic dispersion, prepared in the same process as in Example 1, was added to 60 ml of an aqueous solution containing 4 g of gelatin and 4 g of acacia gum, and the mixture was agitated at 800 rpm and encapsulated into capsules.

Thereafter, the untreated capsules were processed in a pH-adjusting step using acetic acid, sodium carbonate, etc., a cross-linking step using formalin, a drying step, and the like in that order, whereby microcapsules corresponding to the individual colors were prepared respectively.

2. Manufacturing of the Electrophoretic Display Device

First, a substrate having thin film transistor elements (TFT glass substrate) was obtained. The substrate was prepared by the same process as that for preparing TFT substrates used for manufacturing liquid crystal displays.

The microcapsules of each of the colors (which are the same as in Example 4) had an average particle size of 50–60 μm, respectively.

Second, droplets containing an aqueous adhesive were each discharged onto corresponding driving electrodes (separate electrodes), corresponding to red pixels, lying on the TFT glass substrate using an ink-jet device (which was obtained by modifying a commercial ink-jet printer).

Then, the red microcapsules were scattered (supplied) on the TFT glass substrate, followed by curing the adhesive thereby to fix the microcapsules.

Subsequently, the same steps as the above ones were repeated to fix the green and blue microcapsules on the driving electrodes by the adhesive in turn.

Next, a glass substrate with an ITO layer on an entire surface thereof was placed over the microcapsules. Then the substrates were glued together with an emulsion binder ("PORON," manufactured by Shin-Etsu Chemical Co., Ltd.). Thus, an electrophoretic display device was prepared.

When the terminal section of the resulting electrophoretic display device was coupled with a power source through lines to try activating the device, the display device could be activated in multiple colors including black, red, green, blue, and white. Also, the display device could be activated in a secondary color produced by these colors.

Example 4

The electrophoretic display device was manufactured by the same process as that of Example 3 except that microcapsules of four colors, prepared using the electrophoretic dispersions prepared in the same process as in Example 2, were used.

As a result, an electrophoretic display device superior in display in black to that in Example 3 could be obtained.

Example 5

The electrophoretic display device was manufactured by the same process as that of Example 2 except that acrylic particles (acrylic particles having hydroxyl groups), into which hydroxyl groups were introduced by copolymerizing three parts of weight of acrylic monomers having hydroxyl groups with 100 parts of weight of the acrylic particles used in Example 2, were used.

As a result, an electrophoretic display device superior in contrast to the electrophoretic display device manufactured using unprocessed acrylic particles Example 2 could be obtained.

Example 6

The electrophoretic display device was manufactured by the same process as that of Example 4 except that acrylic particles having hydroxyl groups as in Example 5 were used.

As a result, an electrophoretic display device superior in contrast to the electrophoretic display device manufactured using unprocessed acrylic particles Example 4 could be obtained.

Example 7

The electrophoretic display device was manufactured by the same process as that of Example 2 except that acrylic particles (acrylic particles having amino groups), into which amino groups were introduced by copolymerizing three parts of weight of acrylic monomers having amino groups with 100 parts of weight of the acrylic particles used in Example 2, were used.

As a result, an electrophoretic display device superior in contrast to the electrophoretic display device manufactured using unprocessed acrylic particles Example 2 could be obtained.

Example 8

The electrophoretic display device was manufactured by the same process as that of Example 4 except that acrylic particles having amino groups as in Example 7 were used.

As a result, an electrophoretic display device superior in contrast to the electrophoretic display device manufactured using unprocessed acrylic particles Example 4 could be obtained.

Example 9

Black microcapsules, prepared by the same process as that of Example 8, were mixed with an emulsion adhesive ("PORON," manufactured by Shin-Etsu Chemical Co., Ltd.), whereby microcapsule ink was prepared.

Then, the microcapsule ink was coated on a polyethylene terephthalate film having an ITO coating thereon and the resulting film was dried at 90° C. for 10 minutes.

Subsequently, the substrate with microcapsules placed thereon was joined with the TFT element substrate. Thus, an electrophoretic display device was obtained.

When the terminal section of the resulting electrophoretic display device was coupled with a power source through lines to try activating the device, the display device could be activated in monochrome, i.e. in black and white. Also, the display device could be activated in a secondary color produced by these colors.

What is claimed is:

1. An electrophoretic dispersion, comprising:
    a liquid medium; and
    a plurality of particles which are dispersed in the liquid medium and including a first kind of particles and a second kind of particles,
    the first kind of particles and the second kind of particles being inorganic particles and resin particles, respectively.

2. The electrophoretic dispersion according to claim 1, at least one of the first kind of particles and the second kind of particles migrating electrophoretically in response to an electric field.

3. The electrophoretic dispersion according to claim 1, a behavior of the first kind of particles in response to an electric field being different from a behavior of the second kind of particles in response to the electric field.

4. The electrophoretic dispersion according to claim 1, an electric property of the first kind of particles being different from an electric property of the second kind of particles.

5. The electrophoretic dispersion according to claim 1, wherein the resin particles are dyed a color different from a color of inorganic particles.

6. The electrophoretic dispersion according to claim 1, the resin particles being composed mainly of an acrylic resin.

7. The electrophoretic dispersion according to claim 1, the resin particles being dyed any one of red, green, blue, and black.

8. The electrophoretic dispersion according to claim 1, the inorganic particles having an average particle size of A[μm] and the resin particles having an average particle size of B[μm], B/A falling in a range of 1.5–200.

9. An electrophoretic display device, comprising:
    a first electrode;
    a second electrode facing the first electrode and forming a pair of electrodes;
    a liquid medium provided between the first electrode and the second electrode; and
    a plurality of particles which are dispersed in the liquid medium and including a first kind of particles and second kind of particles,
    the first kind of particles and the second kind of particles being inorganic particles and resin particles.

10. The electrophoretic display device according to claim 9, an electric field being produced by the first electrode and the second electrode.

11. An electronic system, comprising:
    the electrophoretic display device according to claim 10.

12. The electrophoretic display device according to claim 9, an electric field being applied between the first electrode and the second electrode.

13. The electrophoretic display device according to claim 9, a behavior of the first kind of particles in response to an electric field being different from a behavior of the second kind of particles in response to the electric field.

14. The electrophoretic display device according to claim 9, an electric property of the first kind of particles being different from an electric property of the second kind of particles.

15. The electrophoretic display device according to claim 9, further comprising:
    a plurality of thin film transistor elements arranged in a matrix and a plurality of pixel electrodes that are one of the pair of electrodes, the thin film transistor elements corresponding to the pixel electrodes.

16. The electrophoretic display device according to claim 9, further comprising:
    a plurality of thin film transistor elements arranged in a matrix and
    a plurality of cell spaces partitioned off by partition and formed between first substrate and a second substrate,
    the cell spaces being each filled with the liquid medium and the plurality of particles; and
    each of the cell spaces corresponding to at least one of the thin film transistor elements.

17. An electrophoretic display device, comprising:
    a first electrode;
    a second electrode facing the first electrode;
    a liquid medium provided between the first electrode and the second electrode; and
    a plurality of particles which are dispersed in the liquid medium and including a first kind of particles and a second kind of particles,
    the first kind of particles and the second kind of particles being inorganic particles and resin particles,
    the liquid medium and the plurality of particles being encapsulated as microcapsules.

18. The electrophoretic display device according to claim 17, a behavior of the first kind of particles in response to an electric field being different from a behavior of the second kind of particles in response to the electric field.

19. The electrophoretic display device according to claim 17, an electric property of the first kind of particles being different from an electric property of the second kind of particles.

20. The electrophoretic display device according to claim 17, further comprising:
    a plurality of thin film transistor elements arranged in a matrix,
    plural kind of the microcapsules including the resin particles dyed different colors and being provided between a first substrate and a second substrate, and
    each of the microcapsules corresponding to at least one of the thin film transistor elements.

* * * * *